United States Patent Office 3,193,548
Patented July 6, 1965

3,193,548
FLUORESCENT TRIAZINYLSTILBENES
Nathan N. Crounse, Cincinnati, Ohio, and John W. Delaney, South Fort Mitchell, Ky., assignors to Sterling Drug Inc., New York, N.Y., a corporation of Delaware
No Drawing. Filed Feb. 16, 1962, Ser. No. 173,840
12 Claims. (Cl. 260—240)

This invention relates to new fluorescent 4-(4,6-disubstituted - s - triazin-2-ylamino)-4'-(4,6-disubstituted-s-triazin - 2 - ylamino)-2,2'-disulfostilbenes useful as optical brightening agents and to the preparation of the same.

Broadly speaking, the novel compounds of this invention are 4 - [4 - ($Y^1$)-6-($Y^2$)-s-triazin-2-ylamino]-4'-[4-($Y^3$) - 6 - ($Y^4$) - s-triazin-2-ylamino]-2,2'-disulfostilbenes having in the free acid form the structural formula

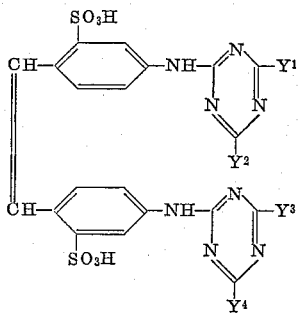

Formula I wherein $Y^1$ is hydroxy-oxaalkylamino, and $Y^2$, $Y^3$, and $Y^4$ are members of the group consisting of chloro; bromo; hydroxy; lower alkoxy; phenoxy; methylphenoxy, methoxyphenoxy; hydroxy-oxaalkylamino; morpholino; piperidino; pyrrolidino; amino radicals having the structural formula

wherein $Z^1$ and $Z^2$ are members of the group consisting of hydrogen, lower alkyl, hydroxy-lower alkyl, lower alkenyl, lower aralkyl, phenyl, lower alkylphenyl, halophenyl, and lower alkoxyphenyl, said hydroxy-oxaalkylamino in each instance having the structural formula —NH—X—O—$CH_2CH_2$—(O—$CH_2CH_2$—)$_n$OH where X is lower alkylene and $n$ is an integer from 0 to 3 inclusive.

In the salt forms of our compounds one or both of the acidic hydrogens in the sulfo groups in the free acid forms of our compounds are replaced by an organic or inorganic cation, for instance ammonium, substituted ammonium or a metal. The choice of an acid form or a salt form of a given compound will depend on a number of factors, for instance the solubility characteristics which are desired in the product.

A particularly preferred group of our new compounds are those wherein $Y^2$, $Y^3$, and $Y^4$ in Formula I are all amino radicals. This preferred group has in the free acid formula

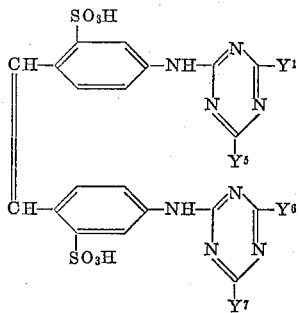

Formula II wherein $Y^1$ is hydroxy-oxaalkylamino, and $Y^5$, $Y^6$, and $Y^7$ are members of the group consisting of: hydroxyoxaalkylamino; morpholino; piperidino; pyrrolidino; and amino radicals having the structural formula

said hydroxy-oxaalkylamino in each instance and $Z^1$ and $Z^2$ all having the same significance as in Formula I.

The hydroxy-oxaalkylamino radical,

—NH—X—O—$CH_2CH_2$—(O—$CH_2CH_2$—)$_n$OH is of course a characteristic structural feature of our new compounds, which contain at least one and, preferably, two, three, or four such radicals. The divalent lower alkylene group X can be either a straight or a branched chain and contains from two to about five carbon atoms, at least two carbons being interposed between the nitrogen and oxygen atoms linked by X. Preferably X is —$CH_2CH_2$— or —$CH_2CH_2CH_2$—. A particularly preferred species of hydroxy-oxaalkylamino radical is the one wherein X is —$CH_2CH_2CH_2$— and $n$ is 1, and thus having the structural formula

—NH—$CH_2CH_2CH_2$—O—$CH_2CH_2$—O
—$CH_2CH_2$—OH

When one or more of $Y^2$, $Y^3$, and $Y^4$ is an amino radical having the structure —N($Z^1$)($Z^2$), there are included the amino radicals wherein $Z^1$ and $Z^2$ are each selected from the group consisting of: hydrogen; lower alkyl containing from one to about six carbon atoms, for instance methyl, ethyl, n-propyl, isopropyl, n-butyl, isohexyl, and the like; hydroxy-lower alkyl containing from two to about six carbon atoms, for instance 2-hydroxyethyl, 2-hydroxypropyl, 4-hydroxybutyl, 3-hydroxyhexyl, and the like; lower alkenyl containing from three to about six carbon atoms, for instance allyl, methallyl, crotyl, 3-hexenyl, and the like; lower aralkyl containing from seven to about eleven carbon atoms, for instance benzyl phenethyl, alphamethylbenzyl, para-methoxybenzyl, 3,4-diethoxybenzyl, para-chlorobenzyl, and the like; phenyl; lower alkylphenyl containing from seven to about ten carbon atoms, for instance ortho-tolyl, meta-tolyl, para-tolyl, meta-ethylphenyl, p-isopropylphenyl, and the like; halophenyl, for instance para-chlorophenyl, ortho-chlorophenyl, 2,4-dichlorophenyl, meta-bromophenyl, and the like; and lower alkoxyphenyl containing from seven to about ten carbon atoms, for instance ortho-methoxyphenyl, meta-ethoxyphenyl, para-isobutoxyphenyl, and the like.

Included among the particularly preferred amino radicals —N($Z^1$)($Z^2$) are primary amino (—$NH_2$), methylamino, dimethylamino, ethylamino, diethylamino, ethanolamino, diethanolamino, 2-hydroxypropylamino, di-(2-hydroxypropyl)amino, allylamino, diallylamino, and anilino.

When one or more of $Y^2$, $Y^3$, and $Y^4$ is lower alkoxy there are included the branched and unbranched radicals having from one to about six carbon atoms in each alkoxy, for instance methoxy, ethoxy, isopropoxy, n-amoxy, isohexoxy, and the like. When one or more of $Y^2$, $Y^3$, and $Y^4$ is methylphenoxy (toloxy), or methoxyphenoxy there are included ortho-toloxy, meta-toloxy, para-toloxy, ortho-methoxyphenoxy, meta-methoxyphenoxy, and para-methoxyphenoxy.

As can be seen from the above, the radicals $Y^2$, $Y^3$, and $Y^4$ can be the same as the hydroxy-oxaalkyl radical $Y^1$ or different from the latter; and $Y^2$, $Y^3$, and $Y^4$ can all be the same, or can be different from each other, as desired.

Our new compounds are obtained by using novel applications of methods which in a general procedural sense are well known in the art. Conveniently, we use as a starting material a 4,4'-bis(4,6-dichloro or dibromo-1,3,5-triazin-2-ylamino)-2,2'-disulfostilbene, or a dialkali metal salt thereof, which can be readily prepared by interaction of 4,4'-diamino-2,2'-disulfostilbene and cyanuric chloride or cyanuric bromide. State in general terms, this route to our compounds of Formula I includes the step of aminating a di-alkali metal salt of 4-[4-($R^1$)-6-($R^2$)-s-triazin-2-ylamino]-4'-[4-($R^3$)-6-($R^4$)-s-triazin-2-ylamino]-2,2'-disulfostilbene having in the free acid form the structural formula

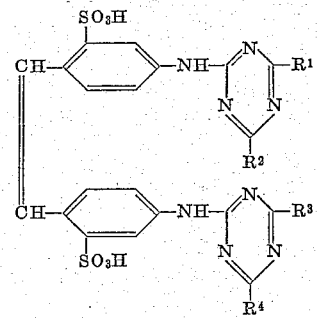

wherein $R^1$ is a member of the group consisting of chloro and bromo, and $R^2$, $R^3$, and $R^4$ are members of the group consisting of: chloro; bromo; hydroxy-oxaalkylamino having the structural formula

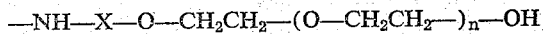

wherein X is lower alkylene interposing at least two carbons between the nitrogen and oxygen atoms it links and $n$ is an integer from 0 to 3 inclusive; morpholino; piperidino; pyrrolidino; and amino radicals having the structural formula

wherein $Z^1$ and $Z^2$ are members of the group consisting of hydrogen, lower alkyl, hydroxy-lower alkyl, lower alkenyl, lower aralkyl, phenyl, lower alkylphenyl, halophenyl, and lower alkoxyphenyl, by interacting said di-alkali metal salt with a hydroxy-oxaalkylamine having the structural formula

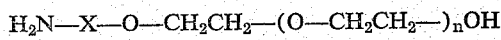

where X and $n$ have the same significance indicated above. This hydroxy-oxaalkylamination step can either precede or follow, as desired, any other amination steps which are used for the introduction of amino groups within the definitions of $Y^2$, $Y^3$, and $Y^4$. Thus, for example, the preferred compounds of Formula II are obtained by amination of a di-alkali metal salt of a 4,4'-bis(4,6-dichloro or dibromo-1,3,5-triazin-2-ylamino)-2,2'-disulfostilbene with a hydroxy-oxaalkylamine having the formula $H_2N-X-O-CH_2CH_2-(O-CH_2CH_2-)_n-OH$ and, if desired, one or more of the aminating agents morpholine, piperidine, pyrrolidine, and ammonia and amines having the formula $H-N(Z^1)(Z^2)$, where X, $n$, $Z^1$ and $Z^2$ have the significance indicated hereinabove, so as to replace all of the four chlorine or bromine substituents in the starting material with four amino radicals, which can be the same or different from each other and in any desired order of introduction, but at least one of the four amino radicals is hydroxy-oxaalkylamino.

By using the amination reaction or reactions to replace only one, two, or three of the four chlorine or bromine atoms in the starting di-alkali metal salt of 4,4'-bis(4,6-dichloro or dibromo-1,3,5-triazin-2-ylamino)-2,2'-disulfostilbene, again at least one hydroxy-oxaalkylamino being introduced, there are obtained the compounds of Formula I wherein at least one of $Y^2$, $Y^3$, and $Y^4$ is chloro or bromo; and these chloro and bromo products can be readily reacted with water, lower alkanols, phenol, cresols, and methoxyphenols, preferably in alkaline medium, to replace the chlorine or bromine substituents with hydroxy, lower alkoxy, phenoxy, methylphenoxy, or methoxyphenoxy substituents, respectively, so as to produce the remaining compounds defined by Formula I.

Depending on the particular intended purposes, the final products are isolated either in the form of the free acids or in the form of metal or ammonium salts; or, if desired, these acids or salts instead of being isolated can be left in the aqueous or organic solvents in which they have been produced, with suitable adjustment of the concentration if necessary.

The salt forms of the compounds of this invention, that is the compounds of Formula I wherein one or both of the acidic hydrogens of the two —$SO_3H$ groups are replaced by a cation, are readily obtained by treating the free acid with the appropriate organic or inorganic base, for instance metal hydroxides, ammonia, and primary, secondary, and tertiary amines. The alkali metal salts are especially useful and economical, and for most uses these salt species are the preferred ones, particularly the highly water-soluble disodium and dipotassium salts. All of the salt forms are readily converted to the corresponding free acid forms by treatment with a strong acid, for instance hydrochloric acid.

Thus, the halo compounds of Formula I, that is, the compounds wherein one or more of $Y^2$, $Y^3$, and $Y^4$ is chloro or bromo, are not only optical brighteners per se but are intermediates useful for the preparation of the rest of the new compounds of this invention.

All of our new compounds of Formula I are fluorescent whitening and brightening agents which are useful for imparting a whitening and brightening effect in the treatment of threads, sheets, films, filaments, textile fabrics, and the like, as well as in the manufacture of paper, varnishes, inks, coatings, and plastics. Many of the salts, and in some cases the free acid forms, of our compounds are readily water-soluble and in aqueous solutions they fluoresce blue-white under ultra-violet light and show a wide range of absorption in the ultraviolet region. These compounds are highly substantive to cotton, cellulose acetate, and viscose rayon.

The preferred group of compounds defined by Formula II have the especially advantageous feature of a high degree of compatibility with the anionic compounds and the quaternary ammonium compounds used in the textile field as finishing agents, for example as fabric softeners, especially in the treatment of fabrics having wash-and-wear resin finishes. Typical quaternary ammonium compounds for this purpose are the higher alkyl-dimethyl-benzyl-ammonium halides, for example benzalkonium chloride, (di-higher alkyl)-(di-lower alkyl)-ammonium halides, for example diluaryl-dimethyl-ammonium chloride, and higher alkyl-pyridinium halides, for example N-lauryl-pyridinium chloride. Softeners are employed in laundry practice and for cotton finishing in textile mills to overcome harsh hand and give the fabric a soft hand. Quaternary ammonium salts are far more effective than either anionic softeners or non-ionic softeners in this respect. Until now a serious drawback to the use of these quarternary ammonium compounds in both laundry practice and textile mill use has been that some of them produce either an undesirable yellowing or a dulling effect on the washed fabric with resulting loss of brightness. In textile mill practice, a softener is applied as a finishing operation. If an optical bleach is applied before this final step, the softener will cover the brightener already on the cloth and mask the brightening effect to a level below that acceptable in the trade. The same problem exists when these compounds are applied as a final rinse in a laundering operation. By incorporating the optical bleach into the softener solution, it is applied as part of the softener and imparts to the textiles the desired level of brightness. However, most brighteners are not compatible with the quaternaries, either not dispersing or forming very insoluble salts that are resistant to dispersion. Although some brighteners can be used with cationic compounds, they require the presence of an emulsifier to hold the brightener in suspension. Many emulsifiers are non-ionic compounds and these have an adverse effect upon the fabric hand.

Our new brightening agents of Formula II require no special formulation with emulsifiers and do not alter the fabric hand. These brighteners can be applied along with the softener as a top dressing in the usual method of softener application.

Among the known fluorescent whitening and brightening agents there are various species which are effective to prevent this yellowing in alkaline washing and rinsing media, but all of the optical brightening agents heretofore available have failed in one or more respects to provide satisfactory performance in the presence of fabric softeners, especially of the quaternary ammonium type in acidic washing and rinsing media, either by failure to have any whitening and brightening effect, and in some instances even to cause dulling, by producing spottiness, by instability in the presence of the acids and catalysts which are used to cure resins employed as wash-and-wear finishes, or by lack of resistance to the high temperatures encountered in drying and ironing. The compounds of the instant invention, on the other hand, are compatible with the quaternary ammonium compound textile finishing agents over a wide pH range, approximately from pH 4 to pH 9, and are non-yellowing under high and low temperature conditions in the presence or in the absence of acids, while at the same time overcoming any yellowing effect by the quaternary ammonium compounds on fabrics treated therewith. As will be appreciated, by virtue of these highly valuable properties of our new compounds the field of usefulness of the quarternary ammonium compound textile finishing agents has been substantially extended.

The presence of our brighteners of Formula II in the softener solution does not significantly alter the stability of the softener solution. Furthermore, the solution can be cooled and reheated without changing its appearance or performance. This stability allows discontinuity of operation in the mill, and also permits the storage of stable formulations for home laundry use.

In addition to the preferred group of compounds of Formula II, certain other species of our new compounds of general Formula I are similarly compatible with quarternary ammonium compound fabric softeners. These include particularly the compounds wherein $Y^1$ and $Y^3$ are hydroxy-oxaalkylamino, and $Y^2$ and $Y^4$ are hydroxy, as illustrated in Example 10 below.

Our invention is illustrated by the following examples without, however, being limited thereto.

*Example 1*

A. To a solution of 21.5 g. of cyanuric chloride in 117 ml. of acetone containing a small amount of a non-ionic wetting agent (0.55 ml. of a polyethylene glycol alkylphenyl ether, Nonic 300, Pennsylvania Salt Mfg. Co.) there were added 218 g. of ice and 163 ml. of water. To this mixture there was gradually added over a period of about 6–8 minutes a solution prepared by dissolving 21.1 g. of 4,4'-diamino-2,2'-disulfostilbene in 151 ml. of water, adding sufficient 45 percent aqueous potassium hydroxide solution (approximately 12.3 g.) to make the mixture barely alkaline to phenolphthalein, and then adding 8.25 g. of anhydrous potassium carbonate and 21.8 g. of ice. The resulting reaction mixture was kept at a temperature below 10° C. and stirred until the reaction was complete as determined by a negative test for unreacted amine in a sample of the reaction mixture. This test was carried out by mixing the sample with a few drops of sodium nitrite solution, acidifying and treating with a solution of R Salt (disodium 2-naphthol-3,6-disulfonate); no bluish red color is developed when the reaction is complete.

B. To the reaction mixture obtained in part A, which contained the dipotassium salt of 4,4'-bis(4,6-dichloro-s-triazin-2-ylamino)-2,2'-disulfostilbene, there was added 9.3 g. of 3-[2-(-hydroxyethoxy)ethoxy]propylamine (Polyglycolamine H–163, Union Carbide Chemical Co.) and the mixture was stirred for one and one-half hours while maintaining the pH at 7 by the gradual addition of 14.5 ml. of a 20 percent aqueous potassium hydroxide solution. During this addition the temperature of the mixture rose to 19° C. The reaction mixture thus produced contained 4-{4-{3-[2-(2-hydroxyethoxy)ethoxy]propylamino} - 6 - chloro - s - triazin-2-ylamino}-4'-(4,6-dichloro-s-triazin-2-ylamino)-2,2'-disulfostilbene (Formula: I:

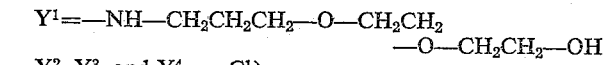

$Y^2$, $Y^3$, and $Y^4$=—Cl).

C. To the reaction mixture obtained in part B there was gradually added over a period of about 10 minutes 5.3 g. of aniline while also gradually adding a 20 percent aqueous potassium hydroxide solution (total of 12.5 ml.) to maintain the pH of the mixture at 7. During this period the temperature of the reaction mixture rose to 24° C. The reaction mixture thus produced contained 4-{4-{3-[2 - (2 - hydroxyethoxy)ethoxy]propylamino}-6-chloro - s - triazin - 2 - ylamino}-4'-(4-anilino-6-chloro-s-triazin-2-ylamino)-2,2'-disulfostilbene (Formula I:

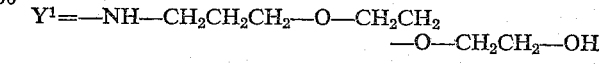

$Y^3$=—NH-phenyl; $Y^2$ and $Y^4$=—Cl).

D. To the reaction mixture obtained in part C there was added 15.9 g. of aniline. The reaction mixture was warmed to 55° C., and 10 g. of disodium phosphate and 14 ml. of a 20 percent aqueous potassium hydroxide solution were added to raise the pH of the mixture to 8.5–9.0. The mixture was heated at reflux temperature for one-half hour and then the acetone was distilled from the reaction mixture. Since a solid product separated from the residual reaction mixture in the form of lumps, the acetone distillate and an additional 40 ml. portion of acetone was added to the mixture, a few drops of 50 percent aqueous sodium hydroxide were added to raise the pH to 9, and the mixture was refluxed for two hours to disintegrate the lumps of solid. There was added 62 ml. of 10 percent hydrochloric acid to make the mixture acidic to Congo red paper, and the mixture was refluxed for one-half hour and then was filtered while still hot (60–65° C.). The solid thus collected was washed with a hot (60° C.) 1 percent aqueous sodium chloride solution. The yellow granular product thus obtained was dried at 70° C. This product, which weighed 55.8 g. was 4-{3-{[2-(2-hydroxyethoxy)ethoxy] - propylamino}-6-anilino-s-triazin-2-ylamino}-4'-(4,6 - dianilino - s - triazin-2-ylamino)-2,2'-disulfostilbene (Formula I:

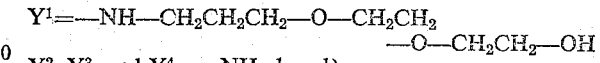

$Y^2$, $Y^3$, and $Y^4$=—NH-phenyl).

*Example 2*

When 6.8 g. of 3-(2-hydroxyethoxy)propylamine is substituted for the 3-[2-(2-hydroxyethoxy)ethoxy]propylamine in part B of Example 1, there is obtained as the amination product 4-{4-[3 - (2 - hydroxyethoxy)propylamino]-6-chloro-s-triazin - 2 - ylamino}-4'-(4,6-dichloro-s-triazin - 2 - ylamino)-2,2'-disulfostilbene (Formula I: $Y^1$=—NH—$CH_2CH_2CH_2$—O—$CH_2CH_2$—OH; $Y^2$, $Y^3$, and $Y^4$=—Cl). By interaction of equimolecular amounts of this product and para-chloroaniline by a procedure similar to that described in part C of Example 1, there is produced the dipotassium salt of 4-{4-[3-(2-hydroxyethoxy)-propylamino]-6-chloro-s-triazin - 2 - ylamino}-4'-

[4-(parachloroanilino)-6-chloro-s-triazin-2-ylamino]-2,2'-disulfostilbene (Formula I:

$Y^1 = -NH-CH_2CH_2CH_2-O-CH_2CH_2-OH$ $Y^3 = -NH-C_6H_4-Cl(p)$; $Y^2$ and $Y^4 = -Cl$). And when each molecular equivalent of this latter product is treated with two molecular equivalents of meta-ethoxyaniline by a procedure similar to that described in part D of Example 1, there is produced 4-{4-[3-(2-hydroxyethoxy)propylamino] - 6 - (meta-ethoxyanilino)-s-triazin-2-ylamino]-4'-[4-(para-chloroanilino) - 6 - (meta-ethoxyanilino)-s-triazin - 2 - ylamino]-2,2'-sulfostilbene [(Formula I:

$Y^1 = -NH-CH_2CH_2CH_2-O-CH_2CH_2-OH$ $Y^2$ and $Y^4 = -NH-C_6H_4-O-C_2H_5(m)$; and
$Y^3 = -NH-C_6H_4-Cl(p))$].

*Example 3*

When 37.1 g. of cyanuric bromide is substituted for the 21.5 g. of cyanuric chloride in the procedure described in part A of Example 1, the product obtained is the dipotassium salt of 4,4'-bis(4,6-dibromo-s-triazin-2-ylamino)-2,2'-disulfostilbene. Mono-amination of this product with 3-[2-(2-hydroxyethoxy)ethoxy]propylamine followed by successive steps of monoamination and diamination with aniline in a manner similar to that described in parts B, C, and D of Example 1 yields the respective product 4-{4-{3-[2-(2-hydroxyethoxy)-ethoxy]propylamino} - 6 - bromo-s-triazin - 2 - ylamino}-4'-(4,6-dibromo-s-triazin-2-ylamino)-2,2'-disulfostilbene (Formula I:

$Y^1 = -NH-CH_2CH_2CH_2-O-CH_2CH_2$
$\qquad -O-CH_2CH_2-OH$ $Y^2$, $Y^3$, and $Y^4 = -Br$); 4-{4-{3-[2-(2-hydroxyethoxy)ethoxy]propylamino}-6-bromo-s-triazin - 2 - ylamino}-4'-(4-anilino-6-bromo-s-triazin-2-ylamino) - 2,2' - disulfostilbene (Formula I:

$Y^1 = -NH-CH_2CH_2CH_2-O-CH_2CH_2$
$\qquad -O-CH_2CH_2-OH$ $Y^3 = -NH-$phenyl; $Y^2$ and $Y^4 = -Br$); and 4-{4-{3-[2-(2-hydroxyethoxy)ethoxy]propylamino} - 6 - anilino-s-triazin-2-ylamino}-4'-(4,6-dianilino-s-triazin-2-ylamino) 2,2'-disulfostilbene, the same final product obtained at the end of part D of Example 1.

*Example 4*

A. To a solution of 86.0 g. of cyanuric chloride in 467 ml. of acetone containing a small amount (2.2 ml.) of a nonionic wetting agent (Nonic 300) there were added 870 g. of ice and 650 ml. of water. To the resulting mixture at a temperature of 5° C. there was gradually added, during a period of approximately fifteen minutes, a solution prepared by dissolving 84.3 g. of 4,4'-diamino-2,2'-disulfostilbene in a mixture of 600 ml. of water, adding sufficient 45 percent aqueous potassium hydroxide solution (approximately 60.0 g.) to make the mixture barely alkaline to phenolphathalein, and then adding 33.0 g. of anhydrous potassium carbonate and 87.0 g. of ice. The temperature of the resulting mixture was approximately 5–7° C. This mixture was stirred while keeping the temperature below 10° C. until the reaction was complete as determined by a diazo test. The reaction mixture thus obtained contained the dipotassium salt of 4,4'-bis(4,6-dichloro-s-triazin-2-ylamino)-2,2'-disulfostilbene.

B. To the reaction mixture obtained as described in part A there was added 42.4 g. of aniline, and the resulting mixture was slurried and warmed to 30° C. over a period of about one hour, while maintaining the pH of the slurry at 6.5–7.0 by gradual addition of a 40 percent aqueous potassium hydroxide solution (approximately 64 g. required). The mixture was stirred at 30° C. until the reaction was complete as determined by a diazo test. The total reaction time was about two hours. The reaction mixture obtained in this manner contained 4,4' - bis(4 - chloro - 6 - anilino - s - triazin - 2 - ylamino)-2,2'-disulfostilbene (Formula I: $Y^1$ and $Y^3 = -Cl$; $Y^2$ and $Y^4 = -NH$-phenyl) in the form of its dipotassium salt.

C. To the reaction mixture obtained as described in part B there was gradually added, over a period of about five minutes, 170 g. of 3-[2-(2-hydroxyethoxy)ethoxy]propylamine, and the resulting mixture was heated at reflux temperature for one-half hour. The acetone was distilled from the reaction mixture over a period of about six hours. The residue in the still was refluxed for one hour, and then 10 percent hydrochloric acid (about 350 ml.) was added to the reaction mixture at 90–95° C. until the mixture was acid to Congo red paper. The acidic mixture was refluxed for fifteen minutes and was then filtered at 90° C. The product thus collected was washed with 1500 ml. of 0.1 percent aqueous sodium chloride solution at 60–70° C. and dried at 75° C. There was thus obtained 241 g. of 4,4'-bis{4 - {3 - [2 - (2 - hydroxyethoxy)ethoxy]propylamino} - 6 - anilino - s - triazin - 2 - ylamino} - 2,2' - disulfostilbene (Formula I:

$Y^1$ and $Y^3 = -NH-CH_2CH_2CH_2-O$
$\qquad -CH_2CH_2-O-CH_2CH_2-OH$ $Y^2$ and $Y^4 = -NH$-phenyl).

*Example 5*

When 155 g. of 2-[2-(2-hydroxyethoxy)ethoxy]ethylamine is substituted for the 170 g. of 3-[2-(2-hydroxyethoxy)ethoxy]propylamine in the procedure described in part C of Example 4, there is obtained as the amination product 4,4'-bis{4-{2-[2-(2-hydroxyethoxy)ethoxy]ethylamino} - 6 - anilino - s - triazin - 2 - ylamino} - 2,2'-disulfostilbene (Formula I:

$Y^1$ and $Y^3 = -NH-CH_2CH_2-O$
$\qquad -CH_2CH_2-O-CH_2CH_2-OH$ $Y^2$ and $Y^4 = -NH$-phenyl).

*Example 6*

A. The procedure described in part A of Example 1 was repeated, and to the reaction mixture containing the dipotassium salt of 4,4'-bis(4,6-dichloro-s-triazin-2-ylamino)-2,2'-disulfostilbene thus obtained there was added 5.3 g. of aniline. The mixture was stirred at 15° C. for ten minutes and then there was added 13.4 ml. of a 20 percent aqueous potassium hydroxide solution to adjust the pH of the mixture to 7. A negative amine test on a sample of the mixture, using a diazo test indicated that no amine reactant remained. The reaction mixture thus obtained contained the dipotassium salt of 4 - (4 - chloro - 6 - anilino - s - triazin - 2 - ylamino)-4' - (4,6 - dichloro - s - triazin - 2 - ylamino) - 2,2' - disulfostilbene (Formula I: $Y^4 = -NH$-phenyl;

$Y^1$, $Y^2$, and $Y^3 = -Cl$)

B. To the reaction mixture obtained in part B there was added 18.6 g. of 3-[2-(2-hydroxyethoxy)ethoxy]propylamine, and after heating the mixture to 28° C. there was added 2.5 ml. of 20 percent aqueous potassium hydroxide solution to adjust the pH of the mixture to 7.5. There was then added 37.2 g. of 3-[2-(2-hydroxyethoxy)ethoxy]propylamine, and the resulting mixture was heated at reflux temperature for one-half hour. The acetone was then removed by distillation and the residual mixture was refluxed for one hour. Forty-two ml. of 10 percent hydrochloric acid was added to the reaction mixture, and this was followed by two volumes of water. The resulting mixture was heated to 75° C., and was then cooled to 25° C. and filtered. The solid thus collected was dried at 70° C. The product thus obtained, which weighed 54.6 g., was 4-{4,6-bis{3-[2-(2-hydroxyethoxy)ethoxy]propylamino} - s - triazin - 2 - ylamino}-

4' - {4 - {3 - [2 - (2 - hydroxyethoxy)ethoxy]propylamino} - 6 - anilino - s - triazin - 2 - ylamino} - 2,2'-disulfostilbene (Formula I:

$Y^1$, $Y^2$, and $Y^3$=—NH—CH$_2$CH$_2$CH$_2$—O
—CH$_2$CH$_2$—O—CH$_2$CH$_2$—OH $Y^4$=—NH-phenyl).

Example 7

When 18.6 g. and 37.2 g. portions of 2-[2-(2-hydroxyethoxy)ethoxy]propylamine are substituted for the respective 18.6 g. and 37.2 portions of 2-[2-(2-hydroxyethoxy)ethoxy]propylamine in the procedure described in part B of Example 6, there is obtained as the final amination product 4-{4,6-bis{2-[(2-hydroxyethoxy)ethoxy]propylamino} - s - triazin - 2 - ylamino} - 4' - {4-{2 - [2 - (2 - hydroxyethoxy)ethoxy]propylamino} - 6-anilino - s - triazin - 2 - ylamino} - 2,2' - disulfostilbene (Formula I:

$Y^1$, $Y^2$, and $Y^3$=—NH—CH$_2$—CH(CH$_3$)
—O—CH$_2$CH$_2$—O—CH$_2$CH$_2$—OH $Y^4$=—NH-phenyl).

Example 8

A. To a solution of 107.5 g. of cyanuric chloride in a mixture of 585 ml. of acetone and 2.7 ml. of a polyethylene glycol alkylphenyl ether (Nonic 300) there were added 1090 g. of ice and 810 ml. of water. To this mixture there was added a solution prepared by dissolving 105.4 g. of 4,4'-diamino-2,2'-disulfostilbene in 755 ml. of water, adding sufficient 50 percent aqueous potassium hydroxide solution (approximately 67.3 g.) to make the mixture barely alkaline to phenolphthalein, and then adding 41.3 g. of anhydrous potassium carbonate and 109 g. of ice. The addition of the diaminostilbenedisulfonic acid solution required about 8-10 minutes, and the temperature of the reaction after the addition had been completed was about 5-7° C. The resulting reaction mixture was then stirred, while maintaining the temperature below 10° C., until the reaction was complete as determined by a diazo test. The reaction mixture thus obtained contained the dipotassium salt of 4,4'-bis(4,6-dichloro-s-triazin-2-ylamino)-2,2'-disulfostilbene.

B. To the reaction mixture obtained in part A there was gradually added over a period of about two minutes 93.0 g. of 3-[2-(2-hydroxyethoxy)ethoxy]propylamine and the resulting mixture was heated to 30° C. during a period of about one-half hour, while keeping the pH of the mixture adjusted to 7-7.5 by gradual addition of a 50 percent aqueous potassium hydroxide solution. The reaction mixture was stirred at 30-32° C. for a period of about two hours, during which time approximately 63.8 g. of 50 percent aqueous potassium hydroxide solution was added. To the reaction mixture there was then gradually added, over a period of about 4-5 minutes, 186 g. of 3-[2-(2-hydroxyethoxy)ethoxy]propylamine, and the resulting mixture was heated to reflux during the period of about three-quarters of an hour and was then held at reflux temperature for one hour. The acetone was removed by distillation over a period of about two hours, during which time a total of 1905 g. of a mixture of acetone and water was removed. The residual reaction mixture was cooled to 30-35° C., sufficient 50 percent aqueous potassium hydroxide solution (approximately 10 ml.) was added to adjust the pH to 10 (faint pink color obtained when tested with phenolphthalein), and the solution was clarified by filtration through diatomaceous silica. A 100 ml. portion of water used for rinsing the container and for washing the solid on the filter was collected and added to the clarified filtrate. There was thus obtained 1946 g. of an aqueous solution having dissolved therein 334 g. of 4,4'-bis{4,6-bis{3-[2-(2-hydroxyethoxy)ethoxy]propylamino}-s-triazin - 2 - ylamino}-2,2'-disulfostilbene (Formula I: $Y^1$, $Y^2$, $Y^3$, and $Y^4$=

—NH—CH$_2$CH$_2$CH$_2$—O—CH$_2$CH$_2$
—O—CH$_2$CH$_2$—OH)

Example 9

A. The procedure described in part A of Example 1 was repeated, and to the reaction mixture containing the dipotassium salt of 4,4'-bis(4,6-dichloro-s-triazin-2-ylamino)-2,2'-stilbenedisulfonic acid thus obtained there was added 18.6 g. of 3-[2-(2-hydroxyethoxy)ethoxy]propylamine. The resulting mixture was stirred for two hours while gradually adding sufficient 20 percent aqueous potassium hydroxide solution (approximately 27 ml.) to maintain the pH at 7.5. The temperature of the mixture was then raised to 30° C. during a period of about one hour, and the mixture was held at a temperature of 30-31° C. for an hour. The reaction mixture thus obtained contained the dipotassium salt of 4,4'-bis{4-{3-[2-(2 - hydroxyethoxy)ethoxy]propylamino}-6-chloro-s-triazin-2-ylamino}-2,2'-disulfostilbene (Formula I: $Y^1$ and $Y^3$=

—NH—CH$_2$CH$_2$CH$_2$—O—CH$_2$CH$_2$
—O—CH$_2$CH$_2$—OH $Y^2$ and $Y^4$=—Cl).

B. To the reaction mixture obtained as described in part A there was gradually added, during a period of about one minute, 13.0 g. of monoethanolamine. The resulting mixture was heated at 60-70° C. for about one-half hour. The acetone was then distilled from the mixture and the reaction mixture remaining in the still was heated at reflux temperature for eighty minutes. The reaction mixture was filtered through diatomaceous silica and there was thus obtained as the filtrate 633 g. of an aqueous solution of about 55 g. of 4,4'-bis{4-{3-[2-(2-hydroxyethoxy)ethoxy]propylamino} - 6 - (2-hydroxyethylamino)-s-triazin-2-ylamino}-2,2'-disulfostilbene (Formula I: $Y^1$ and $Y^3$=

—NH—CH$_2$CH$_2$CH$_2$—O—CH$_2$CH$_2$
—O—CH$_2$CH$_2$—OH $Y^2$ and $Y^4$=—NH—CH$_2$CH$_2$—OH).

Example 10

A. To a reaction mixture containing 4,4'-bis(4,6-dichloro-s-triazin-2-ylamino)-2,2' - disulfostilbene obtained by repeating the procedure described above in part A of Example 1 there was added 18.6 g. of 3-[2-(2-hydroxyethoxy)ethoxy]propylamine. The resulting mixture was stirred for two hours while adding sufficient 20 percent aqueous potassium hydroxide solution (approximately 27 ml.) to maintain the pH at 7.5. The temperature of the mixture was raised to 30° C. over a period of about one hour, and the mixture was then held at 30-31° C. for an hour. The reaction mixture thus obtained, which contained the dipotassium salt of 4,4'-bis{4-{3-[2-(2-hydroxyethoxy)ethoxy]propylamino}-6-chloro-s-triazin - 2 - ylamino}-2,2'-disulfostilbene (the same compound obtained as the product in part A of Example 9), was heated while adding sufficient 20 percent aqueous potassium hydroxide solution (approximately 14.3 g.) to maintain the pH at 7.0-7.5. After a heating period of one and three-quarters hours, the acetone was removed by distillation and the reaction mixture remaining was refluxed for four hours. The reaction mixture was then cooled to 25-30° C. and filtered through diatomaceous silica to clarify the solution. There was thus obtained as the filtrate 643 g. of an aqueous solution containing about 50 g. of 4,4'-bis-{4-{3-[2-(2-hydroxyethoxy)ethoxy]propylamino}-6 - hydroxy-s-triazin-2-ylamino}-2,2' - disulfostilbene (Formula I: $Y^1$ and $Y^3$=

—NH—CH$_2$CH$_2$CH$_2$—O—CH$_2$CH$_2$
—O—CH$_2$CH$_2$—OH $Y^2$ and $Y^4$=—OH).

After standing overnight some of the product separated from solution and this was re-dissolved by addition of 3.9 g. of 50 percent aqueous sodium hydroxide solution.

B. When 4,4'-bis{4-{3-[2-(2-hydroxyethoxy)ethoxy]propylamino}-6-chloro-s-triazin-2-ylamino} - 2,2' - disulfostilbene obtained as an intermediate product in part A above is heated under alkaline conditions with ethanol, with phenol, with m-cresol, and with p-methoxyphenol, the respective products obtained are 4,4'-bis{4-{3-[2-(2-hydroxyethoxy)ethoxy]propylamino} - 6-ethoxy-s-triazin-2-ylamino}-2,2'-disulfostilbene (Formula I: $Y^1$ and $Y^3=$

—NH—CH$_2$CH$_2$CH$_2$—O—CH$_2$CH$_2$
　　　　　　　　　　　　　—O—CH$_2$CH$_2$—OH $Y^2$ and $Y^4=$—O—C$_2$H$_5$); 4,4'-bis{4-{3-[2-(2-hydroxyethoxy)ethoxy]propylamino} - 6 - phenoxy-s-triazin-2-ylamino}-2,2'-disulfostilbene (Formula I: $Y^1$ and $Y^3=$

—NH—CH$_2$CH$_2$CH$_2$—O—CH$_2$CH$_2$
　　　　　　　　　　　　　—O—CH$_2$CH$_2$—OH $Y^2$ and $Y^4=$—O—phenyl); 4,4'-bis{4-{3-[2-(2-hydroxyethoxy)ethoxy]propylamino}-6-m-toloxy - s - triazin-2-ylamino}-2,2'-disulfostilbene (Formula I: $Y^1$ and $Y^3=$

—NH—CH$_2$CH$_2$CH$_2$—O—CH$_2$CH$_2$
　　　　　　　　　　　　　—O—CH$_2$CH$_2$—OH $Y^2$ and $Y^4=$—O—C$_6$H$_4$—CH$_3$(m)); and 4,4'-bis{4-{3-[2 - (2-hydroxyethoxy)ethoxy]propylamino}-6-(p-methoxyphenoxy)-s-triazin-2-ylamino} - 2,2' - disulfostilbene (Formula I: $Y^1$ and $Y^3=$

—NH—CH$_2$CH$_2$CH$_2$—O—CH$_2$CH$_2$
　　　　　　　　　　　　　—O—CH$_2$CH$_2$—OH $Y^2$ and $Y^4=$—O—C$_6$H$_4$—OCH$_3$(p).

*Example 11*

A. 4,4'-bis(4,6 - dichloro-s-triazin - 2 - ylamino) - 2,2'-disulfostilbene (obtained by interacting 18.5 g. of cyanuric chloride with 18.15 g. of 4,4'-diamino-2,2'-disulfostilbene) was diaminated by treatment with 8.55 g. of morpholine in the presence of 8.26 g. of sodium bicarbonate to produce 4,4'-bis(4-chloro-6-morpholino-s-triazin-2-ylamino)-2,2'-disulfostilbene (Formula I: $Y^1$ and $Y^3=$—Cl; $Y^2$ and $Y^4=$morpholino). This product was then diaminated by treatment with 32 g. of 3-[2 - (2-hydroxyethoxy)ethoxy]propylamine to produce 43.7 g. of 4,4'-bis{4-{3-[2-(2-hydroxyethoxy)ethoxy]-propylamino} - 6 - morpholino-s-trazin-2-ylamino}-2,2'-disulfostilbene (Formula I: $Y^1$ and $Y^3=$—NH—CH$_2$CH$_2$CH$_2$—O—CH$_2$CH$_2$
　　　　　　　　　　　　　—O—CH$_2$CH$_2$—OH $Y^2$ and $Y^4=$morpholino).

B. When piperidine and pyrrolidine, respectively, are used instead of morpholine in the procedures of part A above, the corresponding products obtained are 4,4'-bis(4-chloro-6-piperidino - s - triazin - 2 - ylamino)-2,2'-disulfostilbene (Formula I: $Y^1$ and $Y^3=$—Cl; $Y^2$ and $Y^4=$piperidino) and 4,4'-bis(4 - chloro - 6 - pyrrolidino-s-triazin-2-ylamino) - 2,2' - disulfostilbene (Formula I: $Y^1$ and $Y^3=$—Cl; $Y^2$ and $Y^4=$pyrrolidino); and 4,4'-bis{4-{3-[2 - (2 - hydroxyethoxy)ethoxy]propylamino} - 6 - piperidino-s-triazin-2-ylamino} - 2,2'-disulfostilbene (Formula I: $Y^1$ and $Y^3=$—NH—CH$_2$CH$_2$CH$_2$—O—CH$_2$CH$_2$
　　　　　　　　　　　　　—O—CH$_2$CH$_2$—OH $Y^2$ and $Y^4=$piperidino) and 4,4'-bis{4-{3-[2-(2-hydroxyethoxy)-ethoxy]propylamino} - 6 - pyrrolidino-s-triazin-2-ylamino}-2,2'-disulfostilbene (Formula I: $Y^1$ and $Y_3=$—NH—CH$_2$CH$_2$CH$_2$—O—CH$_2$CH$_2$
　　　　　　　　　　　　　—O—CH$_2$CH$_2$—OH $Y^2$ and $Y^4=$pyrrolidino).

*Example 12*

A. To a solution of 21.5 g. of cyanuric chloride in 117 ml. of acetone containing a small amount of a nonionic wetting agent (Nonic 300) there were added 218 g. of ice and 163 ml. of water. To this mixture there was added a solution prepared by dissolving 21.1 g. of 4,4'-diamino-2,2'-disulfostilbene in 150 ml. of water and adding 15.5 g. of 50 percent aqueous potassium hydroxide solution and 9.0 g. of anhydrous potassium carbonate. The resulting mixture was stirred at 5–7° C. until the reaction was complete as determined by a diazo test. To the reaction mixture thus obtained, which contained the dipotassium salt of 4,4'-bis(4,6-dichloro-s-triazin-2-ylamino) - 2,2'-disulfostilbene, there was added 6.51 g. of allylamine followed by 9.6 g. of sodium bicarbonate. The resulting mixture was heated to 30° C. over a period of one-half hour and was held at 30° C. for one hour. There was thus obtained a reaction mixture containing 4,4'-bis(4-chloro-6-allylamino-s-triazin-2-ylamino) - 2,2'-disulfostilbene (Formula I: $Y^1$ and $Y^3=$—Cl; $Y^2$ and $Y^4=$—NH—CH$_2$—CH=CH$_2$)

B. To the reaction mixture obtained at the end of part A above there was added 37.2 g. of 3-[2-(2-hydroxyethoxy)ethoxy]-propylamine, and the resulting mixture was heated at reflux temperature for one-half hour. Acetone was distilled from the mixture until the head temperature reached 100° C., and then refluxing was continued for one hour. The resulting reaction mixture was cooled to room temperature and was filtered. The filtrate thus obtained, which weighed 289.9 g., contained dissolved therein approximately 54 g. of 4,4'-bis{4-{3-[2-(2-hydroxyethoxy)ethoxy]propylamino} - 6 - allylamino-s-triazin-2-ylamino} - 2,2' - disulfostilbene (Formula I: $Y^1$ and $Y^3=$—NH—CH$_2$CH$_2$CH$_2$—O—CH$_2$CH$_2$
　　　　　　　　　　　　　—O—CH$_2$CH$_2$—OH $Y^2$ and $Y^4=$—NH—CH$_2$—CH=CH$_2$).

C. When diallyl amine is substituted for allylamine in the procedure described in part A above the reaction product is 4,4'-bis(4 - chloro - 6 - diallylamino-s-triazin-2-ylamino) - 2,2' - disulfostilbene (Formula I: $Y^1$ and $Y^3=$—Cl; $Y^2$ and $Y^4=$—N(CH$_2$—CH=CH$_2$)$_2$); and diamination of this product with 2-(2-hydroxyethoxy)ethylamine using a procedure similar to that described in part B above yields 4,4'-bis{4 - [2 - (2 - hydroxyethoxy)ethylamino] - 6 - diallylamino-s-triazin - 2-ylamino}-2,2'-disulfostilbene (Formula I: $Y^1$ and $Y^3=$—NH—CH$_2$CH$_2$—O—CH$_2$CH$_2$—OH $Y^2$ and $Y^4=$—N(CH$_2$—CH=CH$_2$)$_2$).

*Example 13*

A. To a reaction mixture containing the dipotassium salt of 4,4'-bis(4,6-dichloro-s-triazin - 2 - ylamino)-2,2'-disulfostilbene obtained by repeating the procedure described at the beginning of Example 12 there was added 12.95 ml. of n-amylamine followed by 9.6 g. of sodium bicarbonate. The resulting mixture was heated to 30° C. during a period of one-half hour and then was heated at 30° C. for one hour. The reaction mixture thus obtained contained 4,4'-bis(4 - chloro - 6 - n - amylamino-s-triazin - 2 - ylamino)-2,2'-disulfostilbene (Formula I: $Y^1$ and $Y^3=$—Cl; $Y^2$ and $Y^4=$—NH—(CH$_2$)$_4$—CH$_3$).

B. To the reaction mixture obtained at the end of part A above there was added 37.2 g. of 3-[2-(2-hydroxyethoxy)ethoxy]-propylamine and the resulting mixture was heated at reflux temperature for one-half hour. Acetone was distilled from the mixture until the head temperature reached 100° C., and then the mixture was refluxed for one hour. The reaction mixture thus obtained was cooled to 35° C. and 75 g. of sodium chloride was added. The upper oily layer which formed was collected. This oil, which weighed 86.6 g. was slurried in 600 ml. of water, and 10 percent hydrochloric acid was added to the slurry until the latter was blue to Congo red paper. The slurry was then filtered, and the solid thus collected was washed free of mineral acid and dried. The product obtained in this manner, which weighed 42.3 g., was 4,4'-bis{4-{3-[2-(2-hydroxyethoxy)ethoxy]propylamino}-6-n-amyl-s-triazin-2-ylamino}-2,2'-disulfostilbene (Formula I: $Y^1$ and $$Y^3 = -NH-CH_2CH_2CH_2-O-CH_2CH_2 \\ -O-CH_2CH_2-OH$$

$Y^2$ and $Y^4 = -NH-(CH_2)_4-CH_3$).

Example 14

A. To a reaction mixture containing the dipotassium salt of 4,4'-bis(4,6-dichloro-s-triazin-2-ylamino)-2,2'-disulfostilbene prepared by repeating the procedure described at the beginning of part A of Example 12 there was added 6.7 g. of 29 percent aqueous ammonium hydroxide. The resulting mixture was heated to 30° C. during a period of one-half hour and was then heated at 30–40° C. for five hours. During these heating periods a total of 30 ml. of 10 percent aqueous potassium hydroxide was added, as required, to maintain the pH of the mixture at 7. There was thus obtained a reaction mixture containing 4,4'-bis(4-chloro-6-amino-s-triazin-2-ylamino)-2,2'-disulfostilbene (Formula I: $Y^1$ and $Y^3 = -Cl$; $Y^2$ and $Y^4 = -NH_2$).

B. To the reaction mixture obtained at the end of part A above there was added 37.2 g. of 3-[2-(2-hydroxyethoxy)-ethoxy]propylamine, and the resulting mixture was heated at reflux temperature for one-half hour. Acetone was distilled from the mixture until the head temperature reached 100° C., and then the mixture was refluxed for one hour. The reaction mixture thus obtained was filtered. The filtrate, which weighed 619.1 g., contained dissolved therein approximately 54 g. of the dipotassium salt of 4,4'-bis{4-{3-[2-(2-hydroxyethoxy)ethoxy]propylamino}-6-amino-s-triazin-2-ylamino}2,2'-disulfostilbene (Formula I: $Y^1$ and $$Y^3 = -NH-CH_2CH_2CH_2-O-CH_2CH_2 \\ -O-CH_2CH_2-OH$$

$Y^2$ and $Y^4 = -NH_2$).

Using 4,4'-bis(4,6-dichloro or dibromo-s-triazin-2-ylamino)-2,2'-disulfostilbene as a starting material and proceeding in a manner similar to the above-described examples, there are obtained by using the appropriate aminating agents the following further illustrative examples of the compounds of our invention:

(a) 4-{4-{3-[-(2-hydroxyethoxy)ethoxy]propylamino}-6-p-methylphenylamino-s-triazin-2-ylamino}-4'-(4-anilino-6-p-methylphenylamino-s-triazin-2-ylamino)-2,2'-disulfostilbene (Formula I:

$$Y^1 = -NH-CH_2CH_2CH_2-O-CH_2CH_2 \\ -O-CH_2CH_2-OH$$

$Y^2$ and $Y^4 = -NH-C_6H_4-CH_3-p$; $Y^3 = -NH-$phenyl).

(b) 4-[4-(15-hydroxy-4,7,10,13-tetroxapentadecyl-amino)-6-methylethylamino-s-triazin-2-ylamino]-4'-(4-benzylamino-6-methylethylamino-s-triazin-2-ylamino)-2,2'-disulfostilbene (Formula I:

$$Y^1 = -NH-CH_2CH_2CH_2-O-CH_2CH_2 \\ -(O-CH_2CH_2)_3-OH$$

$Y^2$ and $Y^4 = -N(CH_3)(C_2H_5)$; $Y^3 = -NH-CH_2$-phenyl).

(c) 4-{4-{3-[2-(2-hydroxyethoxy)ethoxy]propylamino}-6-(hydroxypropylamino)-s-triazin-2-ylamino}-4'-[4-(p-chlorobenzylamino)-6-(2-hydroxypropylamino)-s-triazin-2-ylamino]-2,2'-disulfostilbene (Formula I:

$$Y^1 = -NH-CH_2CH_2CH_2-O- \\ CH_2CH_2-O-CH_2CH_2-OH$$

$Y^2$ and $Y^4 = -NH-CH_2-CHOH-CH_3$
$Y^3 = -NH-CH_2-C_6H_4-Cl(p)$)

(d) 4,4'-bis{4,6-bis[2-(2-hydroxyethoxy(ethyl-amino]-s-triazin-2-ylamino}-2,2'-disulfostilbene (Formula I: $Y^1$, $Y^2$, $Y^3$, and $$Y_4 = -NH-CH_2CH_2-O-CH_2CH_2-OH)$$

(e) 4,4'-bis{4-{3-[2-(2-hydroxyethoxy)ethoxy]-propylamino}-6-dimethylamino-s-triazin-2-ylamino}-2,2'-disulfostilbene (Formula I: $Y^1$ and $Y^3 = -NH-CH_2CH_2CH_2-O-CH_2CH_2-O-CH_2CH_2-OH$ $Y^2$ and $Y^4 = -N(CH_3)_2$).

(f) 4,4'-bis{4-{3-[2-(2-hydroxyethoxy)ethoxy]butylamino}-6-(di-2-hydroxyethyl)amino-s-triazin-2-ylamino}-2,2'-disulfostilbene (Formula I: $Y^1$ and $$Y^3 = -NH-CH_2CH_2-CH(CH_3)-O- \\ CH_2CH_2-O-CH_2CH_2-OH$$

$Y^2$ and $Y^4 = -N(CH_2CH_2OH)_2$).

The structure of our new compounds of Formula I was established by the mode of synthesis and elementary analysis.

The new compounds prepared in accordance with this invention were fluorescent compounds which showed good brightening effects on cotton fabrics. When those species falling within Formula II hereinabove, as well as the species described at the end of part A of Example 10, and quaternary ammonium compound textile softening agents were mixed together in aqueous solution and applied to white cotton fabrics, a soft finish was imparted to the fabric by the quaternary ammonium compound and the thustreated fabric remained free of any yellowing or other discoloring effect. Similarly satisfactory results were obtained when the pH of these aqueous solutions at time of application to the fabrics was varied throughout the range from 4 to 10. Under acidic conditions, the strength of the whitening and brightening agent was in some instances slightly less than in the neutral and basic solutions. For instance, when there was employed an aqueous solution containing 0.1 percent of 4,4'-bis{4-{3-[2-(2-hydroxyethoxy)ethoxy]propylamino}-6-anilino-s-triazin-2-ylamino}-2,2'-disulfostilbene and 2.5 percent of N,N-dilauryl-N,N-dimethylammonium chloride the fluorescence strength was approximately 8 percent less at pH 4.5 than at pH 7.5. However, under acidic conditions, as under neutral and basic conditions, the shade of the brightening agent desirably remained the same. Moreover, regardless of whether treated with acidic, neutral, or basic aqueous solutions of the optical brightener and the quaternary ammonium compound, all of the test fabrics remained white and undiscolored when subjected to heating by drying at 150° C. for fifteen minutes in a circulating-air oven and by pressing between two aluminum plates at approximately 200° C.

The aminating agents referred to hereinabove and used as reactants in the process of this invention are known and readily available classes of compounds. For example, the preferred hydroxy-oxaalkylamines having the formula $$H_2N-CH_2CH_2CH_2-O-CH_2CH_2 \\ -(O-CH_2CH_2-)_nOH$$

where $n$ is an integer from 0 to 3 inclusive, are obtainable by mono-cyanoalkylation of a dihydric alcohol having the formula $HO-CH_2CH_2-(O-CH_2CH_2-)_n-OH$ with acrylonitrile and then reducing the resulting addition product, $$NC-CH_2CH_2-O-CH_2CH_2-(O-CH_2CH_2-)_n-OH.$$

We claim:

1. 4-[4-(-NH-X-O-CH_2CH_2-(O-CH_2CH_2)_n-OH)-6-($Y^2$)-s-triazin-2-ylamino]-4'-[4-($Y^3$)-6-($Y^4$)-s-triazin-2-ylamino]-2,2'-disulfostilbene wherein X is lower alkylene interposing at least two carbon atoms between the nitrogen and oxygen atoms linked thereby, $n$ is an integer from 0 to 3 inclusive and $Y^2$, $Y^3$, and $Y^4$ are members of the group consisting of: chloro; bromo; hydroxy; lower alkoxy; phenoxy; methylphenoxy; methoxyphenoxy;

—NH—X—O—CH$_2$CH$_2$—(O—CH$_2$CH$_2$—)$_n$—OH wherein X is lower alkylene interposing at least two carbon atoms between the nitrogen and oxygen atoms linked thereby, $n$ is an integer from 0 to 3 inclusive; morpholino; piperidino; pyrrolidino; amino radicals having the structural formula

wherein $Z^1$ and $Z^2$ are members of the group consisting of hydrogen, lower alkyl, hydroxy-lower alkyl, lower alkenyl, lower aralkyl, phenyl, lower alkylphenyl, halophenyl, and lower alkoxyphenyl.

2. 4,4'-bis[4-(—NH—X—O—CH$_2$CH$_2$—(O—CH$_2$CH$_2$—)$_n$—OH)-6-anilino-s-triazin-2-ylamino]-2,2'-disulfostilbene wherein X is lower alkylene interposing at least two carbon atoms between the nitrogen and oxygen atoms linked thereby and $n$ is an integer from 0 to 3 inclusive.

3. 4-[4,6-bis(—NH—X—O—CH$_2$CH$_2$—(O—CH$_2$CH$_2$—)$_n$—OH)-s-triazin-2-ylamino]-4'-[4-(—NH—X—O—CH$_2$CH$_2$—(O—CH$_2$CH$_2$—)$_n$—OH)-6-anilino-s-triazin-2-ylamino]-2,2'-disulfostilbene wherein X is lower alkylene interposing at least two carbon atoms between the nitrogen and oxygen atoms linked thereby and $n$ is an integer from 0 to 3 inclusive.

4. 4,4'-bis[4,6-bis(—NH—X—O—CH$_2$CH$_2$—(O—CH$_2$CH$_2$—)$_n$—OH)-s-triazin-2-ylamino]-2,2'-disulfostilbene wherein X is lower alkylene interposing at least two carbon atoms between the nitrogen and oxygen atoms linked thereby and $n$ is an integer from 0 to 3 inclusive.

5. [4-(—NH—CH$_2$CH$_2$CH$_2$—O—CH$_2$CH$_2$—O—CH$_2$CH$_2$—OH)-6-[(hydroxy-lower alkyl)amino]-s-triazin-2-ylamino]-4'-{4-(—NH—CH$_2$CH$_2$CH$_2$—O—CH$_2$CH$_2$—O—CH$_2$—CH$_2$—OH)-6-[(hydroxy-lower alkyl)amino]}-s-triazin-2-ylamino]-2,2'-disulfostilbene.

6. 4,4'-bis[4-(—NH—CH$_2$CH$_2$CH$_2$—O—CH$_2$CH$_2$—O—CH$_2$CH$_2$—OH)-6-(lower alkylamino)-s-triazin-2-ylamino]2-2'-disulfostilbene.

7. 4,4'-bis[4,6-bis(—NH—CH$_2$CH$_2$CH$_2$—O—CH$_2$CH$_2$—O—CH$_2$CH$_2$—OH)-s-triazin-2-ylamino]-2,2'-disulfostilbene.

8. 4,4'-bis[4-(—NH—CH$_2$CH$_2$CH$_2$—O—CH$_2$CH$_2$—O—CH$_2$CH$_2$—OH)-6-(2-hydroxyethylamino)-s-triazin-2-ylamino]-2,2'-disulfostilbene.

9. 4,4'-bis[4-(—NH—CH$_2$CH$_2$CH$_2$—O—CH$_2$CH$_2$—O—CH$_2$CH$_2$—OH)-6-morpholino-s-triazin-2-ylamino]-2,2'-disulfostilbene.

10. 4,4'-bis[-(—NH—CH$_2$CH$_2$CH$_2$—O—CH$_2$CH$_2$—O—CH$_2$CH$_2$—OH)-6-allylamino-s-triazin-2-ylamino]-2,2'-disulfostilbene.

11. 4,4'-bis[4-(—NH—CH$_2$CH$_2$CH$_2$—O—CH$_2$CH$_2$—O—CH$_2$CH$_2$—OH)-6-amino-s-triazin-2-ylamino]-2,2'-disulfostilbene.

12. 4,4'-bis[4-(—NH—CH$_2$CH$_2$CH$_2$—O—CH$_2$CH$_2$—O—CH$_2$CH$_2$—OH)-6-hydroxy-s-triazin-2-ylamino]-2,2'-disulfostilbene.

References Cited by the Examiner
UNITED STATES PATENTS

| | | | |
|---|---|---|---|
| 2,660,578 | 11/53 | Williams et al. | 260—249.6 |
| 2,713,046 | 7/55 | Williams et al. | 260—249.5 |
| 2,945,762 | 7/62 | Carroll et al. | 260—249.8 |

WALTER A. MODANCE, *Primary Examiner.*

DUVAL T. McCUTCHEN, *Examiner.*

UNITED STATES PATENT OFFICE
CERTIFICATE OF CORRECTION

Patent No. 3,193,548                                       July 6, 1965

Nathan N. Crounse et al.

It is hereby certified that error appears in the above numbered patent requiring correction and that the said Letters Patent should read as corrected below.

Column 1, lines 58 and 59, for "free acid formula" read -- free acid form the structural formula --; column 6, line 6, for "3-[2-(-hydroxyethoxy)" read -- 3-[2-(2-hydroxyethoxy) --; column 9, line 16, for "4-{4,6-bis{2-[(2-" read -- 4-{4,6-bis{2-[2-(2- --; column 11, lines 69 and 70, for that portion of the formula reading $Y_3=$ read $Y^3=$ column 13, line 46, for "4-{4-{3-[-(2-" read -- 4-{4-{3-[2-(2- --; line 75, for "(2-hydroxyethoxy(ethyl-amino}-" read -- (2-hydroxyethoxy)ethyl-amino]- --; column 15, lines 42 and 43, for that portion of the formula reading [4-(- read 4-[4-(- column 16, lines 22 and 23, for that portion of the formula reading 4,4′-bis[-(- read 4,4′-bis[4-(-

Signed and sealed this 7th day of June 1966.

(SEAL)
Attest:

ERNEST W. SWIDER                                  EDWARD J. BRENNER
Attesting Officer                                    Commissioner of Patents